June 20, 1967    H. J. PACK ETAL    3,325,856
CRAB HANDLING APPARATUS
Filed Sept. 14, 1964    9 Sheets-Sheet 2
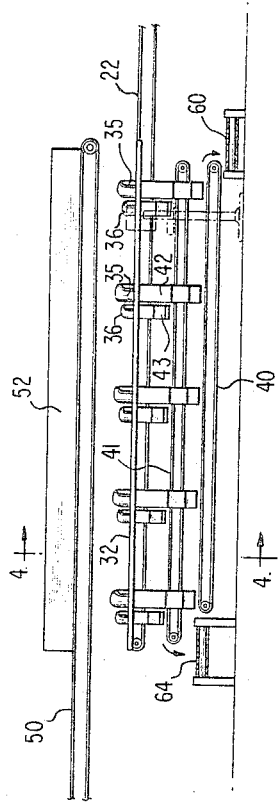
INVENTORS
HOBART J. PACK
JOHN L. DENTON
BY *Burns, Doane, Benedict, Swecker & Mathis*
ATTORNEYS June 20, 1967 H. J. PACK ETAL 3,325,856
CRAB HANDLING APPARATUS
Filed Sept. 14, 1964 9 Sheets-Sheet 3
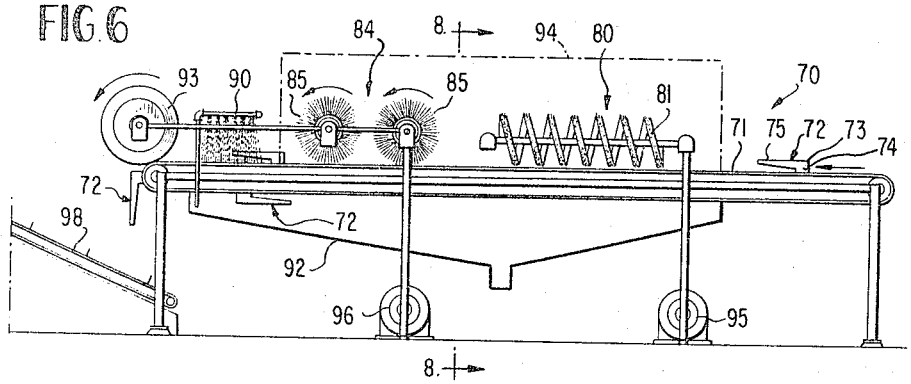
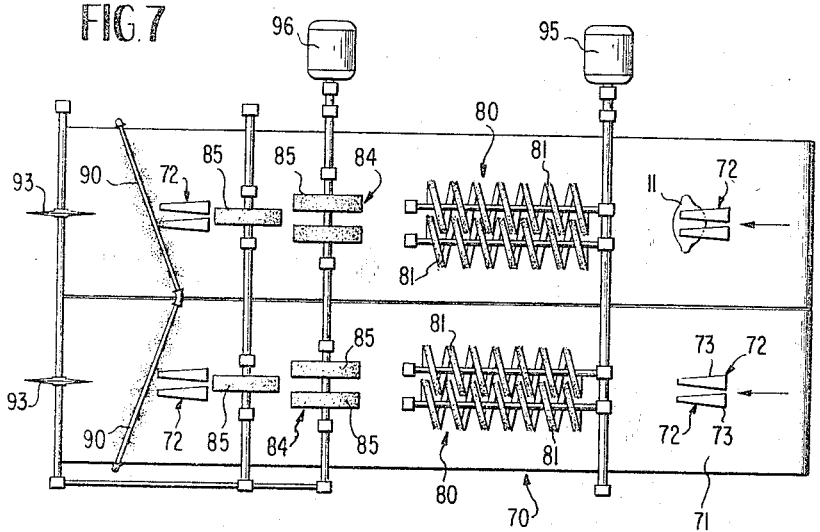
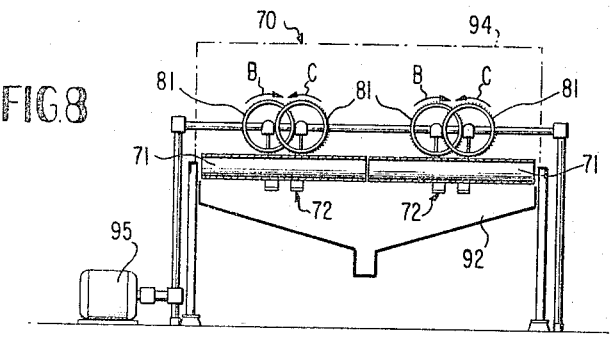
INVENTORS
HOBART J. PACK
JOHN L. DENTON
BY
ATTORNEYS

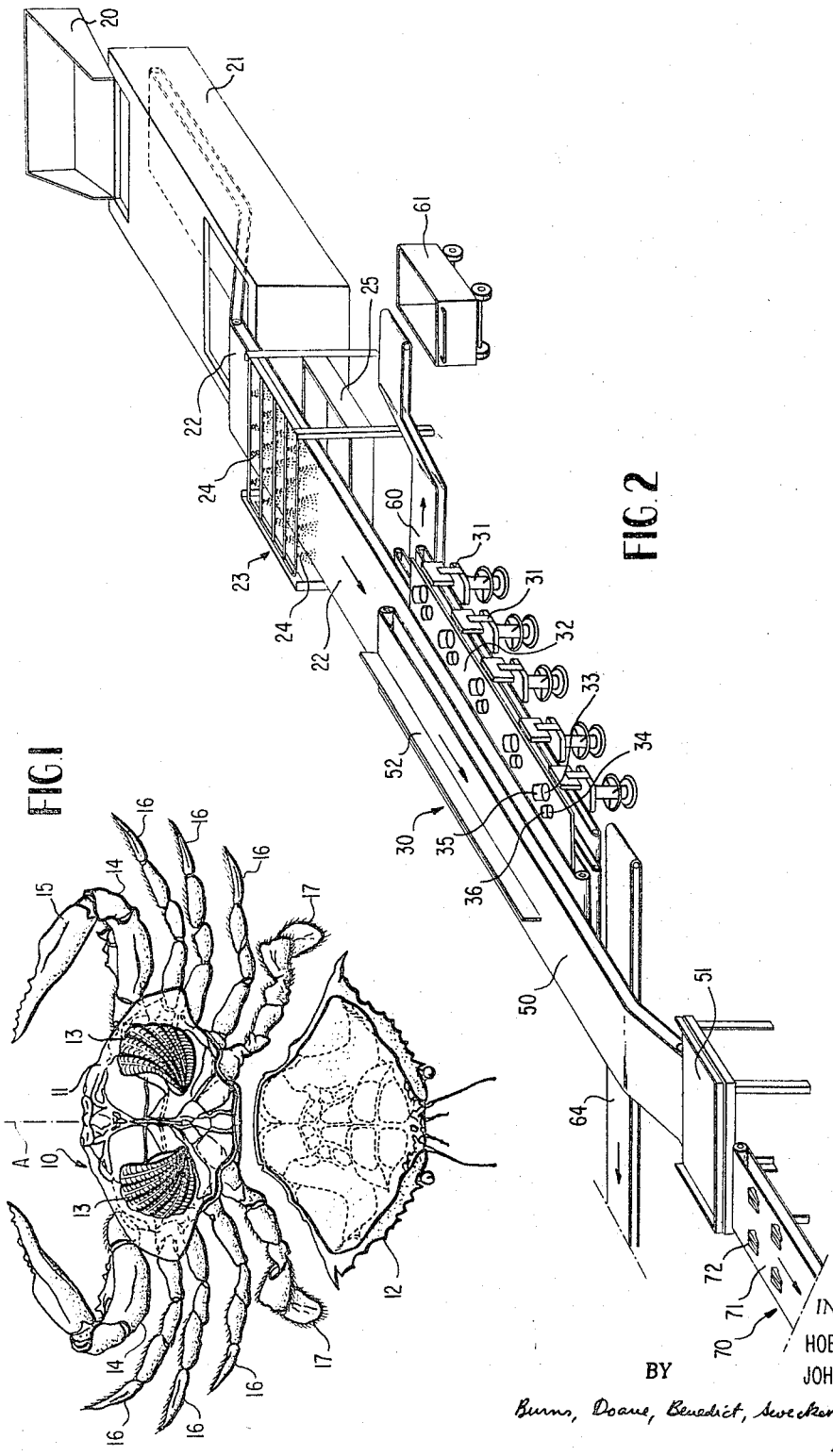

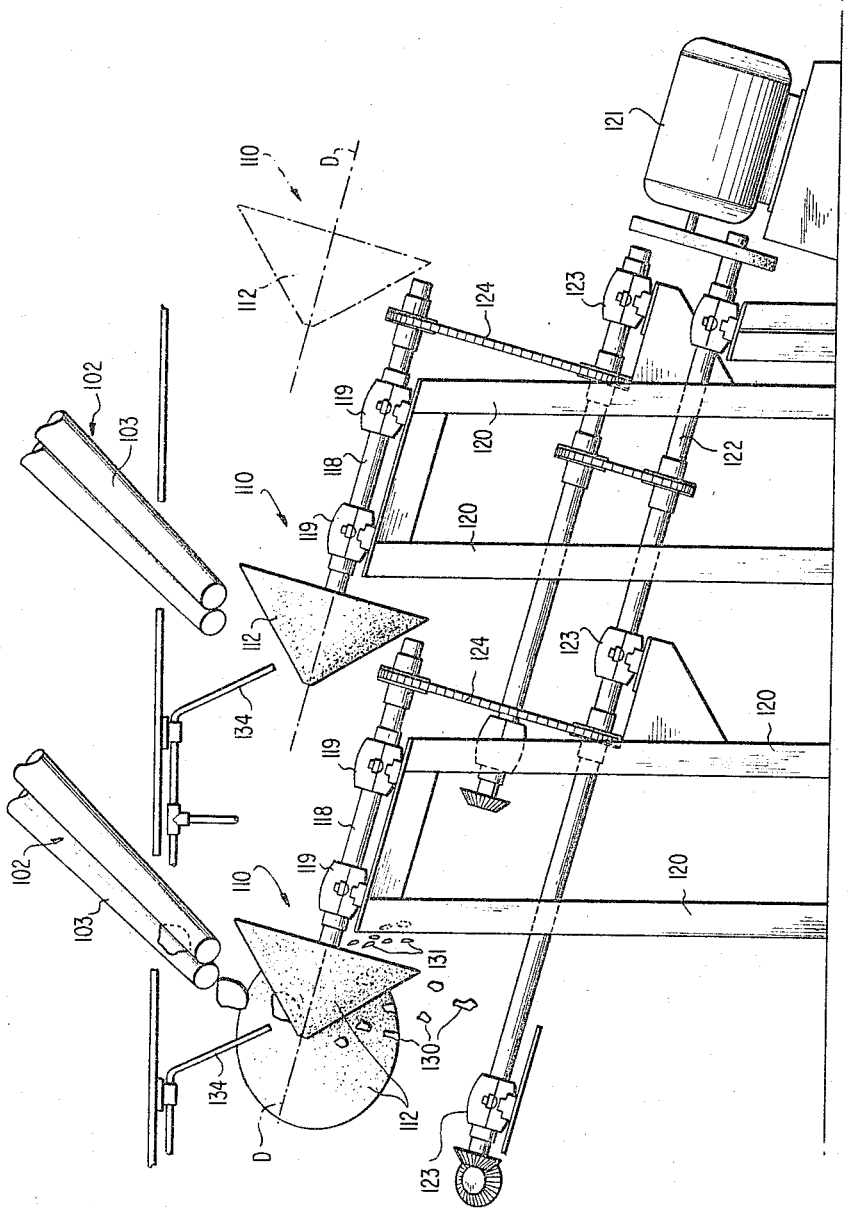

June 20, 1967 H. J. PACK ETAL 3,325,856
CRAB HANDLING APPARATUS
Filed Sept. 14, 1964 9 Sheets-Sheet 5

INVENTORS
HOBART J. PACK
JOHN L. DENTON
BY *Burns, Doane, Benedict,*
*Swecker & Mathis*
ATTORNEYS June 20, 1967  H. J. PACK ETAL  3,325,856
CRAB HANDLING APPARATUS Filed Sept. 14, 1964  9 Sheets-Sheet 6

INVENTORS
HOBART J. PACK
JOHN L. DENTON

BY Burns, Doane, Benedict,
Swecker & Mathis
ATTORNEYS

INVENTORS
HOBART J. PACK
JOHN L. DENTON

BY Burns, Doane Benedict, Swecker & Mathis
ATTORNEYS

United States Patent Office 3,325,856
Patented June 20, 1967

3,325,856
CRAB HANDLING APPARATUS
Hobart J. Pack, Mayport, and John L. Denton, Jacksonville, Fla., assignors to Seafood Processors, Inc.
Filed Sept. 14, 1964, Ser. No. 396,096
18 Claims. (Cl. 17—2)

This invention relates to a crab handling apparatus. More particularly, this invention relates to the commercial processing of crabmeat, particularly meat from the hard-shelled blue crab.

Crabs of several varieties are abundant in the coastal waters of the United States and the world. The crabmeat industry in the United States extends for the most part along the southeastern Atlantic seaboard, including the Chesapeake Bay, and throughout the gulf coast. Crabmeat processed and marketed in the United States comes primarily from the hard-shelled blue crab; and while this invention concerns the processing of meat from the blue crab, it pertains also to the processing of other edible hard-shelled crabs as well.

Commercial picking, packing and processing methods for recovering crabmeat at crabmeat plants have changed very little since the beginning of this industry. The most significant step in the operation requires the separating of the crabmeat from the shell and boney fragments of the body and claws. Throughout the industry this step in the operation is done almost exclusively by hand. In fact, almost all of the work carried out in crabmeat plants is essentially a hand operation whether the plants are large or small.

The processing of crabmeat is generally the same throughout the industry. Most crabmeat plants are located close to the water from which the crabs are taken since it is not feasible to transport live crabs or to store live crabs for an extended period between the time they are removed from the water and the processing begins. In general, processing of the live crabs starts as soon as they are unloaded at the plant from the boats or trucks. The live crabs are steamed or boiled in large kettles until the meat is completely cooked and the shell becomes stiff. Normally, the crabs are cooked for at least fifteen minutes. The crabs are cooled after cooking, usually by leaving them in cooking baskets at room temperature. Sometimes air is blown over the baskets, and in some plants the baskets are placed in a cooling room. Frequently the cooked crabs are merely dumped in heaps on large concrete tables.

After the cooked crabs have cooled, in most plants they are taken directly to the picking operation which is carried out manually. This consists of a number of workers taking each crab, one at a time, debacking, removing claws, legs and fins and eviscerating the crabs. This series of steps is sometimes referred to as bobbing. The picking operation concludes with the actual hand separating of the crabmeat from the shell and boney fragments. The crabmeat is collected for further processing and the residue is usually disposed of as waste, although attempts have been made to recover by-products from the residue. The crabmeat from the picking operation is usually placed in plastic bags or cans. Sometimes the crabmeat is pasteurized or frozen before it is sent to market.

An apparatus called the Harris crab picking machine is used in a few crabmeat plants principally in claw picking and almost exclusively for producing crabmeat to be processed into crab cakes. This is because the machine shreds the meat and the saline flotation separation of meat from the shell makes the meat too salty for ordinary consumption. Except for the Harris machine, the picking of crabmeat is a hand operation requiring each crab to be handled separately. Attempts have been made in the past to develop apparatus for picking crabs mechanically. These, however, for the most part have met with complete failure or are not adaptable to commercial crab picking operations.

It has been recognized for a long time that there is considerable need to mechanize the crab picking industry in order to eliminate the high percentage of labor involved, to process large numbers of crabs more rapidly, to eliminate storage problems, to increase sanitation, and to otherwise more efficiently and effectively produce commercially high quality crabmeat. The primary object of this invention is to provide apparatus and a method for recovering meat from crabs which satisfy these requirements.

This is accomplished by apparatus for handling crabs throughout an entire crab picking operation along with a novel method of recovering and processing crabmeat. The apparatus includes a series of stations for continuously performing different operations on the crabs and parts of the crabs. One of the first stations includes pretreating means where the crabs in bulk are subjected to a high temperature for a limited time. The pretreated crabs are carried on a conveyor past a washing and cooling station to a debacking station where the backs and claws are removed from the bodies manually. The claws and bodies are placed on different conveyors for further processing at other stations. The debacked bodies are transferred to a brushing conveyor and held thereon by a split clamp device to be carried past two groups of brushes which eviscerate the bodies to expose the desirable meat. The conveyor carries the bodies past a washing station and then through rotating blades which pass between the clamp parts whereupon each crab body is halved.

The body halves fall from the brushing conveyor and are transferred to a group of positioning and feed rollers. These rollers are in pairs, the rollers of each pair being tapered with the larger ends up, and disposed at an angle of approximately forty-five degrees to the horizontal. The rollers of each pair are spaced apart an equal distance throughout their length and rotate about their longitudinal axis with the adjacent portions of the rollers rotating upwardly. The crab body halves fall onto the top of the rollers; and as the rollers rotate, the body halves are properly positioned and slide downwardly in the V formed by the rollers.

At the next station, the body halves are applied to a demeater apparatus comprising a pair of cone-shaped heads abutted together and positioned so that the line of contact between the two heads is at an angle of approximately fifteen degrees with the horizontal. The body halves drop from the feed rollers onto the upper portion of the demeater apparatus; and as the conical heads turn with the adjacent portions rotating downwardly, a squeezing action is applied to the body halves. The shell and boney fragments are pulled through the conical heads and the meat remains above the line of contact between the two conical heads. The meat flows downwardly along the line of contact assisted by a stream of water, falls off the heads of the demeater, and is collected on a conveyor for further processing. The shell and boney fragments are collected on another conveyor and transferred to disposal or to further processing.

The claws from the debacking station are separated into the arm section and the pincers. The arm sections are applied to a demeater apparatus and the pincers are transferred to a grading station which includes a pair of rotating conical grading rollers spaced apart a gradually increasing distance. The grading rollers are grooved and as they turn, they propel the pincers along. The small size pincers first fall through the space between the rollers and the larger size pincers are advanced. In this manner, the pincers are separated according to size. The several groups of graded pincers are passed to cracking devices which include rotating grooved cracker wheels providing a passage therethrough of a smaller dimension than the size of the pincers to be handled. The cracker wheels break up the hard shell of the pincers which are then deposited on a conveyor. The pincers then pass to a station where the shell is separated from the meat. The shell fragments are sent to disposal or to further processing, and the meat is collected for further processing.

The method of recovering crabmeat includes a controlled pretreatment of the crabs. The pretreating solidifies or makes the crabmeat firm, and this facilitates the separation of the meat from the shell; yet, the meat is not fully cooked and the shell is not brittle.

The meat from the crabs collected from the various stations can be reconstituted or molded into lump form by pressing pieces of the meat together and then cooking the meat to completion. Juices, seasoning, or flavoring may be added during the cooking as desired. In addition to actually producing in effect raw crabmeat, which is not ordinarily obtainable as a commercial food item, the crabmeat which is produced affords a variety of new and advantageous ways of storing, preserving and marketing crabmeat. Since the crabmeat has not been fully cooked, it can be canned and then cooked in the can, or it can be frozen for cooking immediately prior to consumption, or it can be handled in a number of ways not possible with the crabmeat obtained from ordinary crab picking methods where the crabmeat is cooked completely prior to picking.

The invention is illustrated in the accompanying drawings in which:

FIGURE 1 is a representation of a blue crab showing the back removed;

FIGURE 2 is a perspective view of a portion of the apparatus of this invention including the pretreating station, the washing-cooling station, the debacking station, a portion of the eviscerating station and some of the conveyor apparatus;

FIGURE 3 is a side elevation view of part of the debacking station;

FIGURE 4 is a cross-section view taken along line 4—4 of FIGURE 3;

FIGURE 5 is a perspective view of additional parts of the apparatus of this invention including the eviscerating station, the positioning and feed rollers and the demeating station;

FIGURE 6 is a side elevation view of the brushing station;

FIGURE 7 is a plan view corresponding with FIGURE 6;

FIGURE 8 is a cross-section view taken along line 8—8 of FIGURE 6;

FIGURE 9 is an enlarged side elevation view showing the details of part of the demeater apparatus;

FIGURE 17 is a cross section view taken along line 17—17 of FIGURE 16; and

Figure 11:
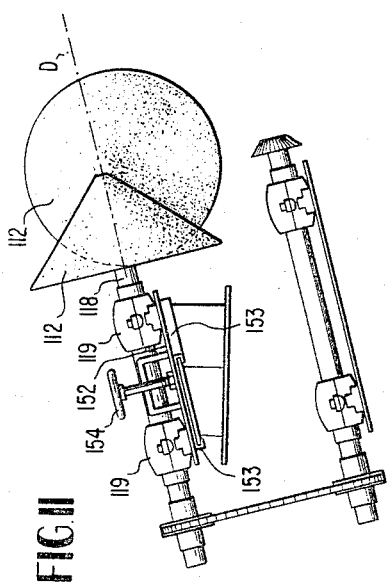
FIGURE 11 is an elevation view of part of the demeater apparatus, as viewed from left-to-right with respect to FIGURE 10, showing the relationship of the demeater heads.

FIGURE 1 shows a typical Atlantic blue crab 10. The crab has a main body 11 covered by a shell which when mature is hard and stiff. The back 12 of the body is shown removed as if it has been folded away. A large amount of the meat in the body 11 lies beneath the gills 13 which must be removed for access to the meat. Claws having an arm section 14 and a pincer 15 at the end extend from the front of the body and contain a significant amount of meat. Usually, the arms and pincers together are commonly referred to as the claws. Three walking legs 16, or swimmers as they are sometimes called, at each side of the body contain some recoverable meat. Back fins 17 contain a considerable amount of desirable lump meat at the juncture with the body. Crabmeat of commercial value is obtained from the mature crab having a hard shell, and this invention concerns the removing of meat from the so-called hard-shelled crabs.

The apparatus of this invention provides a complete system for removing and collecting meat from crabs in a continuous operation. The apparatus includes a series of stations at which different operations are performed, some manually, but most by mechanical means. The manual work is greatly enhanced by the apparatus provided, and the total manual labor required is considerably less compared with conventional crab picking operations.

The entire apparatus provides an efficient system for handling large amounts of crabs for the commercial production of crabmeat. Individual parts of the apparatus can be used to supplement portions of, and thereby enhance, conventional crab picking operations. For the sake of clarity, certain parts of the apparatus have been omitted in some of the figures.

The front or starting end of the apparatus of this invention includes a hopper 20 into which live crabs are placed in bulk as they are delivered to the plant by truck or boat. From the hopper 20 the crabs are fed into a pretreating apparatus 21. The crabs are carried through the pretreater 21 by an endless conveyor 22, preferably made of stainless steel strands or perforated stainless steel sheets. The pretreater 21 includes suitable steam coils located beneath the portion of the conveyor 22 which extends through the apparatus to provide a steam treating atmospheric condition through which the conveyor travels. If desirable, the pretreater 21 may contain boiling water through which the conveyor 22 travels.

The crabs are pretreated or conditioned in the pretreater 21 but are not actually cooked in the sense that crabs are cooked prior to picking in ordinary operations. In fact, it is highly desirable that the crabmeat not be cooked as is now the standard practice. The crabs remain in the pretreater 21 for from three to five minutes only, while the temperature of the pretreater is maintained above two hundred degrees F. The three to five minute duration can be determined by the speed of the conveyor 22. For maximum efficiency, the feeding of the crabs from the hopper 20 into the pretreater 21 should be set so that there is a constant flow of crabs into and out of the pretreater 21. It is not essential that crabs be fed constantly into the apparatus, but it is necessary for the most effective recovery of the meat that the crabs be pretreated at a temperature of above two hundred degrees F. for from three to five minutes. This makes the meat firm and tends to loosen the meat from the shell but does not completely cook the meat.

The conveyor 22 carries the pretreated crabs out of the pretreater 21 past a washing-cooling station 23 which comprises a series of spray nozzles 24 located above the conveyor 22 for spraying water downwardly over the conveyor 22 and the crabs as they pass. The spray of water washes and cools the crabs. Dirty water is caught in a pan 25.

The crabs continue on the conveyor 22 to a debacking station 30 comprising a number of positions for workers on each side of the conveyor 22. For example, as illustrated in FIGURES 2, 3 and 4, five chairs 31, each representing one position, are located at each side of the conveyor. A table 32 extends to the side at the same level as the conveyor 22. At each position, there is a pair of holes 33 and 34 through the table. Each hole is partially surrounded by a shield 35 and 36, respectively.

Beneath the table 32 there are two pairs of endless type conveyors. The lower pair of conveyors 40 move toward the right with respect to the FIGURE 3 and the upper pair of conveyors 41 move toward the left. Guide chutes 42 extending from the holes 33 direct material onto the lower conveyors 40 and guide chutes 43 extending from the holes 34 direct material onto the conveyors 41. Above the conveyor 22 and table 32 and extending along the several chairs 31 is a transfer conveyor 50 leading to a table 51. A plate-like shield 52 extends upwardly from the middle of transfer conveyor 50 for a distance past the chairs 31.

A worker, located at each position 31, picks a pretreated crab off of the conveyor 22, debacks the crabs, that is removes the back of the shell, places the removed back 12 through the hole 33, whereupon the back falls through the chute 42 onto the conveyor 40. The worker then removes the two claws with the arm sections 14 and pincers 15 still connected, and places these through the hole 34 where they are guided by the chute 43 onto the conveyor 41. The worker then places the debacked-declawed crab body onto the transfer conveyor 50. The backs 12 are carried by the conveyor 40 to a conveyor 60 which in turn deposits the backs into a cart 61 for transfer to disposal or to further processing. The claws are carried by the conveyor 41 to a conveyor 64 which in turn carries the claws to a succeeding station for further processing as will be explained. The debacked-declawed bodies are transferred by the conveyor 50 onto a table 51.

An eviscerating station 70, shown in detail in FIGURES 6, 7 and 8, is located beyond the table 51 and includes an endless type conveyor 71 having fastened thereto a number of clamps 72. Each clamp 72 comprises spaced apart clamp elements 73 each of which has a post 74 fastened to the conveyor and an arm 75 extending in tapered relationship with respect to the surface of the conveyor 71, as illustrated in FIGURE 6.

One worker, or more, if necessary, is located at the front end of the conveyor 71 adjacent the table 51. As the debacked-declawed crabs pile up on the table 51 from the transfer conveyor 50, the worker takes the crabs one at a time from the table 51 and places each crab under one of the clamps 72 with the bottom part of shell of the crab body adjacent the top surface of the conveyor 71 so that the inside back of the crab is exposed upwardly. The clamps 72 shown in the drawings, for the sake of illustration, are somewhat larger in proportion than should actually be used. As much of the crab body as possible should be exposed. Instead of the particular arm 75 structure illustrated, spring wire of one-quarter inch diameter, or even less, may be used to hold the crab bodies on the conveyor 71. The conveyor 71 carries each of the clamped crabs through two brushing zones of the eviscerating station 70.

The first brushing zone 80 comprises two spiral-shaped brushes 81 intermeshed, as illustrated in FIGURES 7 and 8, and rotating about an axis longitudinally of the direction of movement of the conveyor 71 so that the adjacent parts of the brushes rotate downwardly, as shown by arrows B and C in FIGURE 8. As each crab body passes the spiral brushes 81, the bristles sweep past and around the clamping arms 75, across and into the body, and remove the gills and other loose, fleshy portions which are less stiff or firm than the meat. The meat ordinarily is stuck to the shell whereas the non-edible portions are not. The walking legs 16 may or may not be removed from the body by the brushes 81.

The conveyor 71 and the clamps 72 carry the bodies past the second brushing position 84 comprising sets of brushes 85 which rotate about an axis extending transversely of the direction of movement of the conveyor 71. The bristles of the brushes 85 sweep past the crab bodies, counterclockwise with respect to FIGURE 6, to remove remaining gill portions and other fleshy portions of the body not taken out by the brushes 81. The brushes 85 may also remove some of the walking legs 16.

The conveyor 71 propels the eviscerated crab bodies past a row of nozzles 90 located above the conveyor. Water sprays from the nozzles 90 downwardly onto the crab bodies to wash away gill fragments and other fleshy material loosened from the bodies by the brushes 81 and 85. Preferably the conveyor 71 is of stainless steel mesh or perforated stainless steel sheets so that waste material may be washed through the conveyor into a hopper 92 located beneath the conveyor and then to disposal.

A rotating blade 93, or similar cutting device, is located at the rear of the conveyor 71 in alignment with the space between the two arms 73 of each clamp 72. The clamp 72 forces each crab body through the blade 93 so that the blade cuts the crab body into two pieces approximately along the line A shown in FIGURE 1. As necessary, the blade 93 may be positioned close to or within grooves in the conveyor 71 to assure that the crab bodies are cut through.

A stainless steel hood 94 may cover the brushing zones 80 and 84 to collect debris flying off the brushes. A motor 95 drives the brushes 81 and a motor 96 drives the brushes 85 and the blades 93. As shown in FIGURE 7, two sets of facilities at the brushing stations 70 are provided; for example, two sets of aligned clamps 72, two parallel brushing zones 80 and brushing zones 84. The conveyor 71 preferably is in two independently operable sections and the facilities on either side are adapted to be operated independently.

As the clamps 72 turn downwardly at the rear of the conveyor 71 due to the return movement of the conveyor, the body halves fall from the conveyor 71 onto an endless-type feed conveyor 98. The body halves are carried upwardly by the conveyor 98 to a series of feed roller assemblies 102. There may be four independent parallel sections 99 to the conveyor 98. Each section 99 receives one crab body half from a clamp 72. Plates 100 on the conveyor 98 prevent the body halves from sliding rearwardly down the inclined part of the conveyor.

Each feed roller assembly 102 includes a pair of rollers 103, each of which is gradually tapered throughout its length. The spacing between the rollers in minimal and constant. The roller assemblies 102 are positioned approximately forty-five degrees with the horizontal with the end having the larger diameter located upwardly to receive the body halves of the crabs as they fall from the feed conveyor 98. The positioning of the conveyor 98 and the feed roller assemblies 102 is illustrated in FIGURE 5. Suitable guides may be provided along the sides of the conveyor 98 to contain the body halves. A guide 104 assures that the body halves will fall into a V formed by the pairs of rollers 103.

The feed roller assemblies 102 are driven so that the rollers 103 rotate with the inside turning upwardly and outwardly. The body halves are somewhat flat and rounded; and as they fall into the V formed by the rollers 103, they become aligned generally vertically. The rotation and slope of the roller assemblies moves the body halves downwardly to a series of demeater stations 110 shown in detail in FIGURES 9–13. The feed rollers 103 may be of stainless steel or other material. The rollers 103 may be cylindrical; however, the tapered configuration has advantages, for example, the larger ends easily receive the body halves as they fall from the conveyor 98 and the smaller ends are more suitable for association with the demeater station 110.

Figure 10:
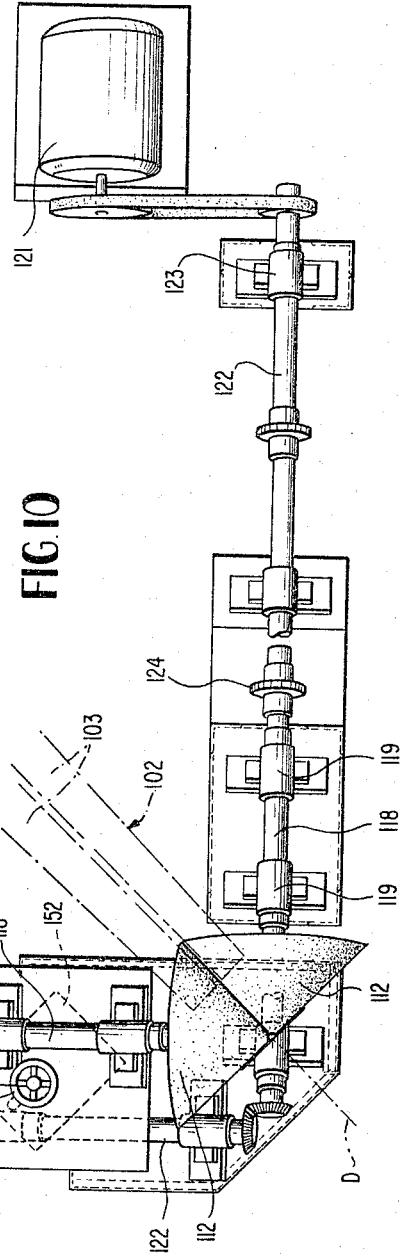
FIGURE 10 is an enlarged plan view of part of a demeater station including some of the apparatus shown in FIGURE 9.

Each demeater station 110 includes a pair of cone-shaped demeater heads 112. The positional relationship of the demeater heads 112 and the roller assemblies 102 is illustrated in FIGURES 9 and 10. Each demeater head 112 has a cone-shaped core 114, which may be of metal, with a surface covering 115, one and one-quarter inch, 40 derometer neoprene or the equivalent. The characteristics of the surfacing material may vary; however, it is preferable that a resilient or springy material such as rubber or plastic, or the like, be used. The resiliency and surface texture of a one and one-quarter inch thick layer of 40 derometer neoprene over metal has proven to be entirely satisfactory, although it is recognized that there may be equivalent structures. Each demeater head 112 is mounted on a drive shaft 118 fastened to a coupling 116 fixed to a back plate 117. The shaft 118, in turn, is supported in gear blocks 119 on suitable frame members 120. An electric motor 121 may be employed for supplying power to drive the demeater heads 112 through main shafts 122, mounted in bearing blocks 123, and drive chains 124. The demeater heads 112 of each pair are positioned together in direct contact. The line of contact between the demeater heads is represented by the line D in FIGURES 9, 10 and 11. The line D slopes downwardly because the smaller ends of the demeater heads 112 are higher than the wider ends.

Figure 12:
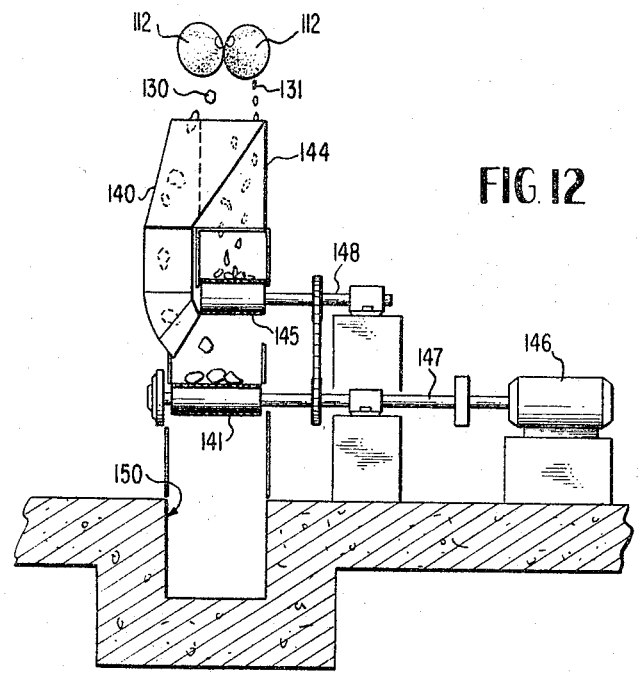
FIGURE 12 is an elevation view of the conveying apparatus at a demeater station.
Figure 13:
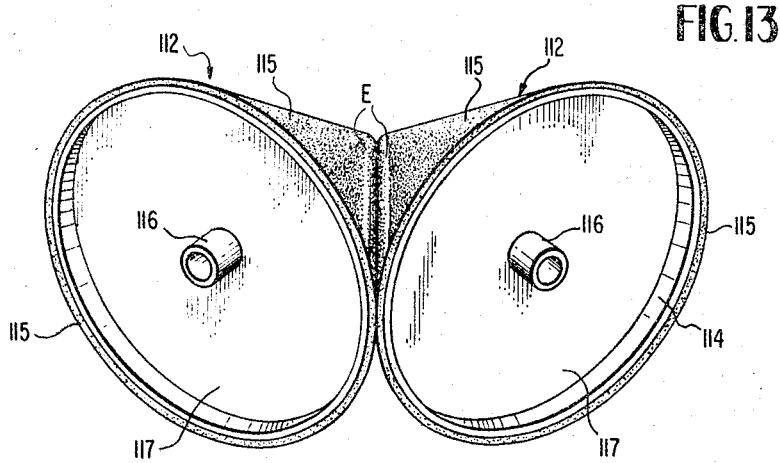
FIGURE 13 is an enlarged perspective view of a pair of demeater heads.

The lower end of the feed roller assemblies 102 are positioned with respect to the demeater heads 112 so that the body halves of the crabs fall onto the upper end of the V formed by the conical-shaped demeater heads. Since the line of contact between the two demeater heads is sloped downwardly, the body halves tend to roll back between the demeater heads. The demeater heads rotate so that the adjoining inside surfaces move downwardly. The crab body halves are in effect dropped onto the trailing side of the V formed by the heads 112. As the heads rotate, small, parallel ridges E build up in the surfaces 115 immediately prior to the convergence of the surfaces at the line of contact caused by the flexible nature of the covering surfaces 115 and speed of rotation. The body halves, as they fall onto the demeater heads, land in the proper vertically aligned position at the upper end of the demeater heads due to the delivery action of the feed roller assemblies 103. As the demeater heads 112 rotate, the shell portions and boney fragments of the body are drawn downwardly between the ridges E and between the demeater heads, as shown in FIGURES 9 and 12 at 130. The pressure applied to the body halves by the action of the rotating demeater heads, in effect, squeezes the meat away from the shell and boney fragments. The meat, which is less stiff than the shell, stays on top of the line of contact D between the demeater heads and flows down the line of contact toward the larger ends of the conical-shaped demeater heads and falls therefrom as shown in FIGURES 9 and 12 at 131.

A nozzle 134 is located at the top or small end of each of the pair of the demeater heads 112 and emits a stream of water which washes over the demeater heads and flows downwardly on top of the line of contact and assists the flow of meat off the larger ends of the demeater heads.

Beneath each pair of demeater heads 112 at each demeater station 110 there is located apparatus for collecting the shells and boney fragments separately from the desirable meat. The shells 130 fall into a chute 140 and onto a conveyor 141 for collection for further processing or disposal. The meat 131 falls through a chute 144 onto a conveyor 145 and is transferred to a point where it is collected for further processing. A motor 146 propels shafts 147 and 148 which in turn drive the conveyors 141 and 145. A drain or sump 150 is located beneath each demeater station 110 for collecting water and debris from the demeater heads 112 and conveyors 141 and 145.

Although variances may be made in the relative dimensions of the demeater heads, it has been found that nine inches from the rounded tip of the demeater head to the rear is satisfactory. An angle of fifteen degrees between the drive shaft and the horizontal is satisfactory. This provides a corresponding fifteen degree slope to the line of contact D for the flow of the crabmeat off of the demeater heads. It has been found that if the demeater heads 112 are rotated at approximately 30 r.p.m. the most effective separation of meat from the shell and boney fragments is achieved. This speed may be varied somewhat with desirable results still maintained. One demeater head 112 should be adjustable with respect to the other demeater head 112 of each pair so that the pressure between the two may be adjusted, and so that the heads may be separated for repair and cleaning. This, for example, is accomplished by the mounting arrangement illustrated in FIGURES 10 and 11, wherein one shaft 118 rotates in bearings 119 which are mounted on a plate 152 slidable on tracks 153 and held by a releasable threaded connector 154. The cone-shaped demeater head arrangement has proved to be entirely satisfactory, although similar results may be obtained with two cylindrical demeater heads.

The meat recovered by this apparatus is not unnecessarily shredded and, in fact, remains in quite large natural flake and lump pieces. Practically all of the meat is removed from the shell. It has been observed that some meat passes between the demeater heads with the shell, but the meat that passes through is washed off the heads on succeeding revolutions and is recovered. Should any of the walking legs not be removed from the crab body at the eviscerating station, these actually aid in the pulling through of the shell and in no way detract from the efficient operation of the demeater heads 112. The desirable back fin lump meat located at the joint of the back fins and the body portion, for the most part, is preserved in lump form. Since most of the meat is not pulled through the demeater heads, very little shredding action, if any, is applied to the meat.

Figure 14:
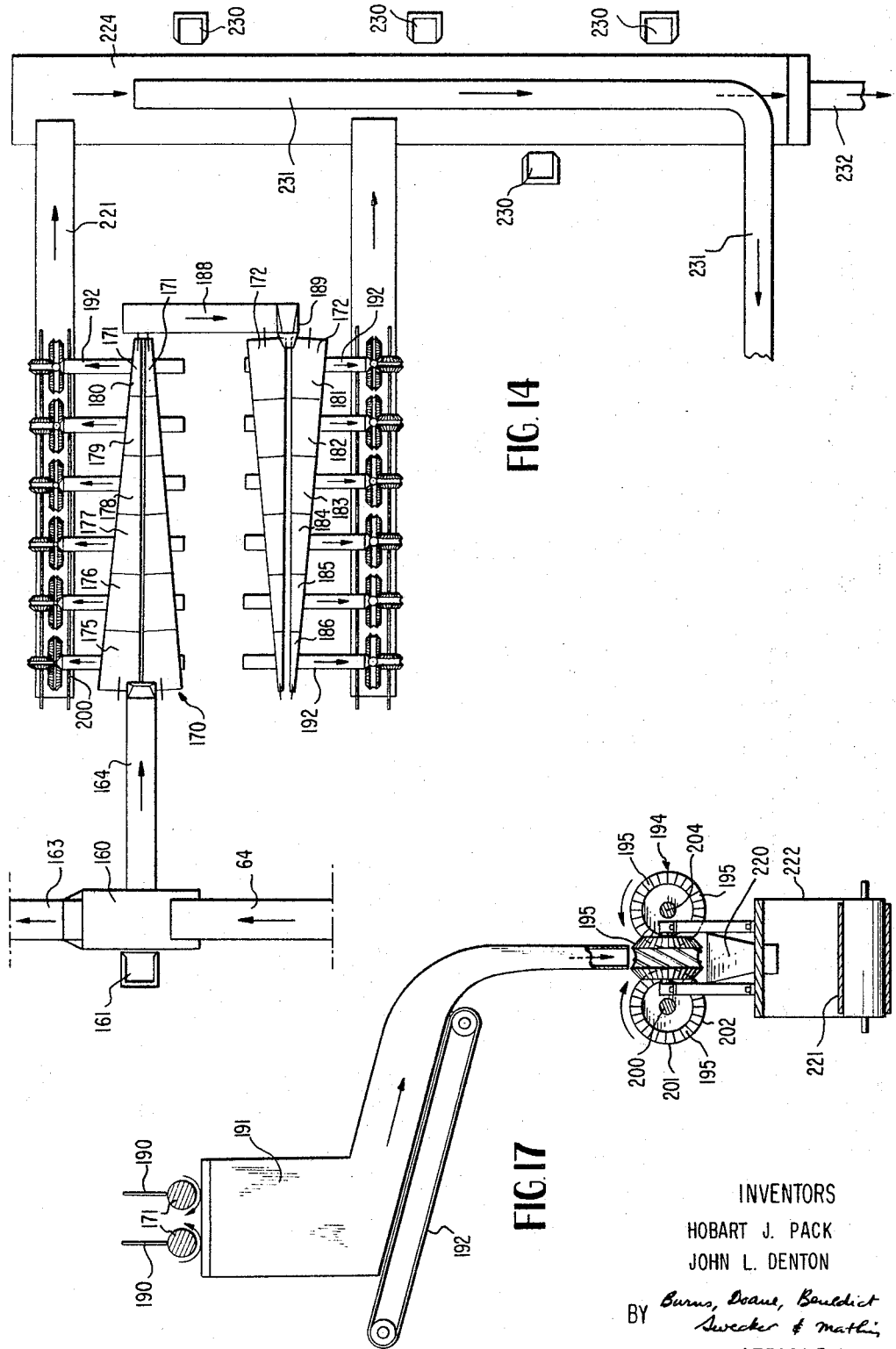
FIGURE 14 is a plan view of the claw separation station, the pincer grading apparatus, the cracker stations, the pincer picking station, and some of the conveyor apparatus.
Figure 15:
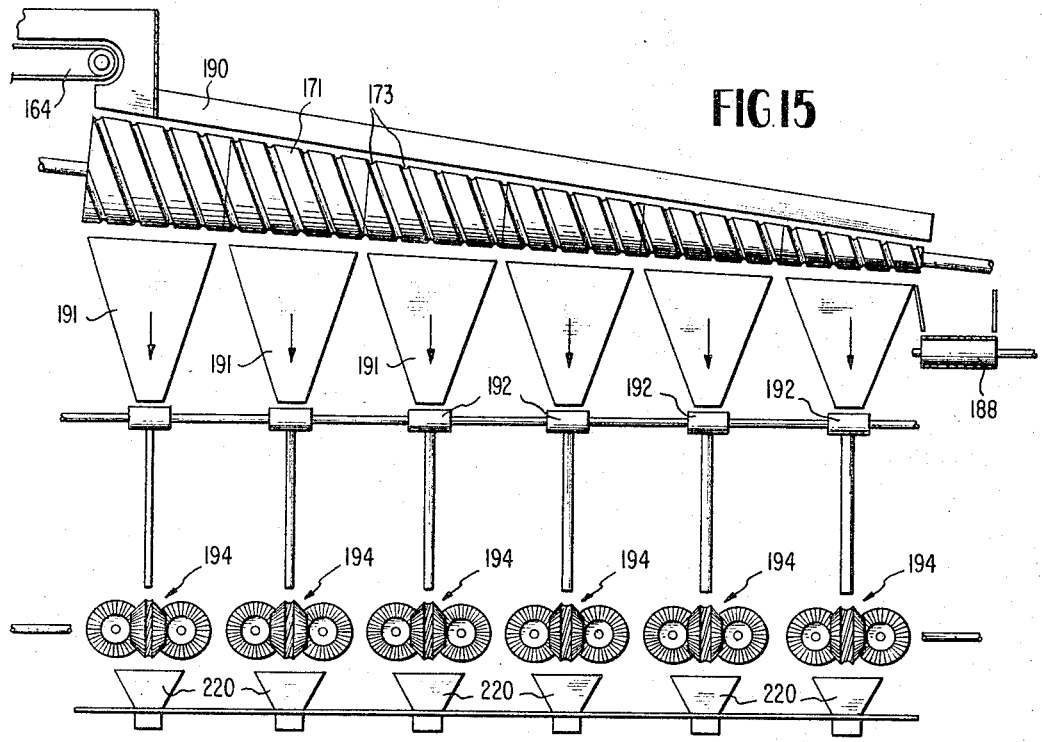
FIGURE 15 is an enlarged side elevation view of a portion of the pincer grading apparatus and cracker stations.

As illustrated in FIGURE 14, the conveyor 64 delivers the claws to a table 160 where a worker positioned at 161 separates each claw arm section 14 from the pincers 15. The arm sections 14 are placed on a conveyor 163 and the pincers on a conveyor 164.

The arm portions 14 are delivered to demeater heads identical with the demeater heads 112. A conveyor system including the conveyor 163 may deliver the claw arms 14 directly to the feed conveyor 98 for treatment of the claw arms 14 by the demeater stations 110 along with or independently of the body halves of the crabs. The identical meat extracting effect is applied to the claw arms 14 as to the body halves. The hard shell surrounding the claw arm portions 14 is pulled through the demeater heads and the meat slides off in the manner described previously.

The pincers 15 are transferred to a grading station 170 which separates the several pincers according to size. The grading station 170 illustrated in FIGURE 14 comprises two sets of grade rollers 171 and 172. One set of rollers could be employed; however, the two sets are used for more advantageous use of space.

Figure 16:
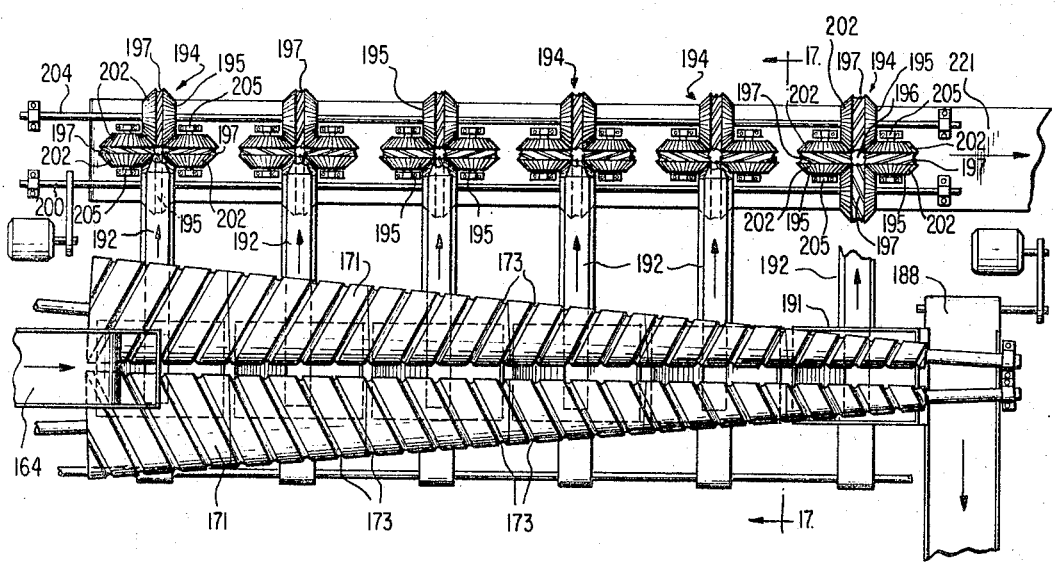
FIGURE 16 is a plan view corresponding with FIGURE 15.

The grade rollers 171 and 172 are cone-shaped and spaced with the larger ends closer together than the smaller ends, as illustrated in FIGURES 14 and 16. The pincers 15 are deposited onto the large end of the rollers 171 and are propelled toward the smaller ends of the action of a spiral groove 173 in the surface of the rollers. The rollers 171 and 172 rotate with the adjoining portions moving upwardly and outwardly. Preferably each set of rollers 171 and 172 is divided into six areas 175–186 of equal length with a difference of about 5/16 inch in the average spacing between the rollers at the middle of each area. The maximum spacing between the rollers 171 and 172 at the end of the six areas 175–180 may be as follows: 5/16 inch, 3/8 inch, 7/16 inch, 1/2 inch, 9/16 inch, 5/16 inch; and at the end of the six areas 181–186: 11/16 inch, 3/4 inch, 13/16 inch, 7/8 inch, 15/16 inch and 1 inch. As the pincers 15 move onto the rollers 171, the smaller pincers having a maximum dimension of about 5/16 inch first fall between the pair of rollers 171. The pincers 15 which do not fall through the area 175 continue to move toward the smaller end of the rollers 171. The pincers 15 continue to fall between the rollers 171 according to size. Pincers 15 which do not fall through area 180 drop onto a transfer belt 188 which carries them to a chute 189 from which they fall onto the second set of grade rollers 172. Guides 190, shown in FIGURE 17, may be used to contain the pincers on the grade rollers 171 and 172.

As the pincers 15 are separated according to size by the rollers 171 and 172, they fall into corresponding hoppers 191 located beneath the rollers. The hoppers 191 guide the pincers onto belts 192 which transfer the pincers to cracking stations 194.

Each cracking station 194 includes four vertically positioned cracker wheels 195. Each wheel 195 has a grooved circumferential periphery. With four cracker wheels 195 in position, the four grooved peripheries form a circular opening 196. The radius of each groove in the cracker wheel 195 is dimensioned according to the spacing between the grade rollers 171 and 172 at the corresponding areas 175–186 so that the diameter of each hole is about 1/16 inch less than the maximum spacing of the corresponding area of the grade rollers. Based on the suggested maximum spacing for the areas 175–176, the corresponding diameter of the openings 196 should be 1/4 inch, 5/16 inch, 3/8 inch, 7/16 inch, 1/2 inch, 9/16 inch, 5/8 inch, 11/16 inch, 3/4 inch, 13/16 inch, 7/8 inch, 15/16 inch, respectively. Although four cracker wheels 195 are used at each station 194, two wheels could be used to provide an opening 196. The grooved surface in each cracker wheels 195 has a series of raised beads or ridges 197. The cracker wheels 195 rotate with the adjoining portions moving downwardly.

The pincers 15 which fall through the first area 175 pass downwardly through the first cracker station 194; and because the maximum dimension of the pincers is somewhat larger than the circular passage 196, the hard shell of the pincer will be cracked and crushed. The beads 197 on the grooved surfaces aid in forcing the pincers through the opening 196 and in breaking the shell. A similar action occurs at each cracker station.

Each cracker wheel 195 is positively driven by a drive shaft 200 which propels one of the cracker wheels 195. Meshed bevel gears 202 on opposite sides of each cracker wheel cause all wheels to rotate. Several cracker wheels may be mounted on a common idler shaft 204 while the intermediate wheels are mounted on separate shafts 205, as necessary.

The crushed pincers fall through a guide chute 220 and onto a conveyor 221 within a guide housing 222. The pincers are carried to a sorting belt 224 along which there are a plurality of positions 230 for workers who take the crushed pincers from the belt 224 and remove the meat from the shells, placing the meat on a raised transfer conveyor 231 which carries the meat to a collection point. A conveyor 232 is provided beneath the conveyor 224 onto which the crushed shell portions of the pincers may be placed for transfer to disposal or collection for further processing along with the backs of the crabs.

Meat collected from the apparatus can be processed or handled in several different ways. For example, it can be marketed as is. It can be frozen or canned in its pretreated condition, that is, in its semi-cooked condition. It can be cooked and then marketed.

The crabmeat obtained from the apparatus, for the most part, is of the same grade as the meat obtained from present commercial operations; that is, some is stringy and shredded-like, some is in flake form, and some is in lump form. A significant difference, however, is that the meat is little more than totally raw, whereas meat obtained by present commercial operations is fully cooked. It has been discovered that the meat obtained from the apparatus of this invention can be reconstituted; that is to say, the stringy and shredded-like portions of the meat can be pressed in a mold, and then cooked to completion, with the result that the formerly stringly and shredded-like portions will cohere into flake or lump form. The pressing can be accomplished by ordinary canning apparatus, or special presses and molds may be used for making different shaped crabmeat lumps.

Furthermore, in the reconstituting process, the flavor of the crabmeat can be enhanced considerably by adding natural flavoring obtained from the crab shell. For example, the backs removed from the shell are boiled in a kettle, or the like, whereupon fatty, oily substances adhering to the inside of the shell are collected in the water. The liquid containing the fatty, oily substances is condensed and an appropriate amount as needed for the desired flavor effect is added to the meat before it is pressed and cooked, or cooked without pressing.

The apparatus of this invention provides for the convenient collection of the shell portions of the crab for further processing into by-products since, at each stage, the shell portions can be recovered separately from the fleshy waste material. Because the crabs are washed prior to the meat separation processes, the shell portions collected are relatively clean and hence by-product processing is enhanced.

Figure 18:
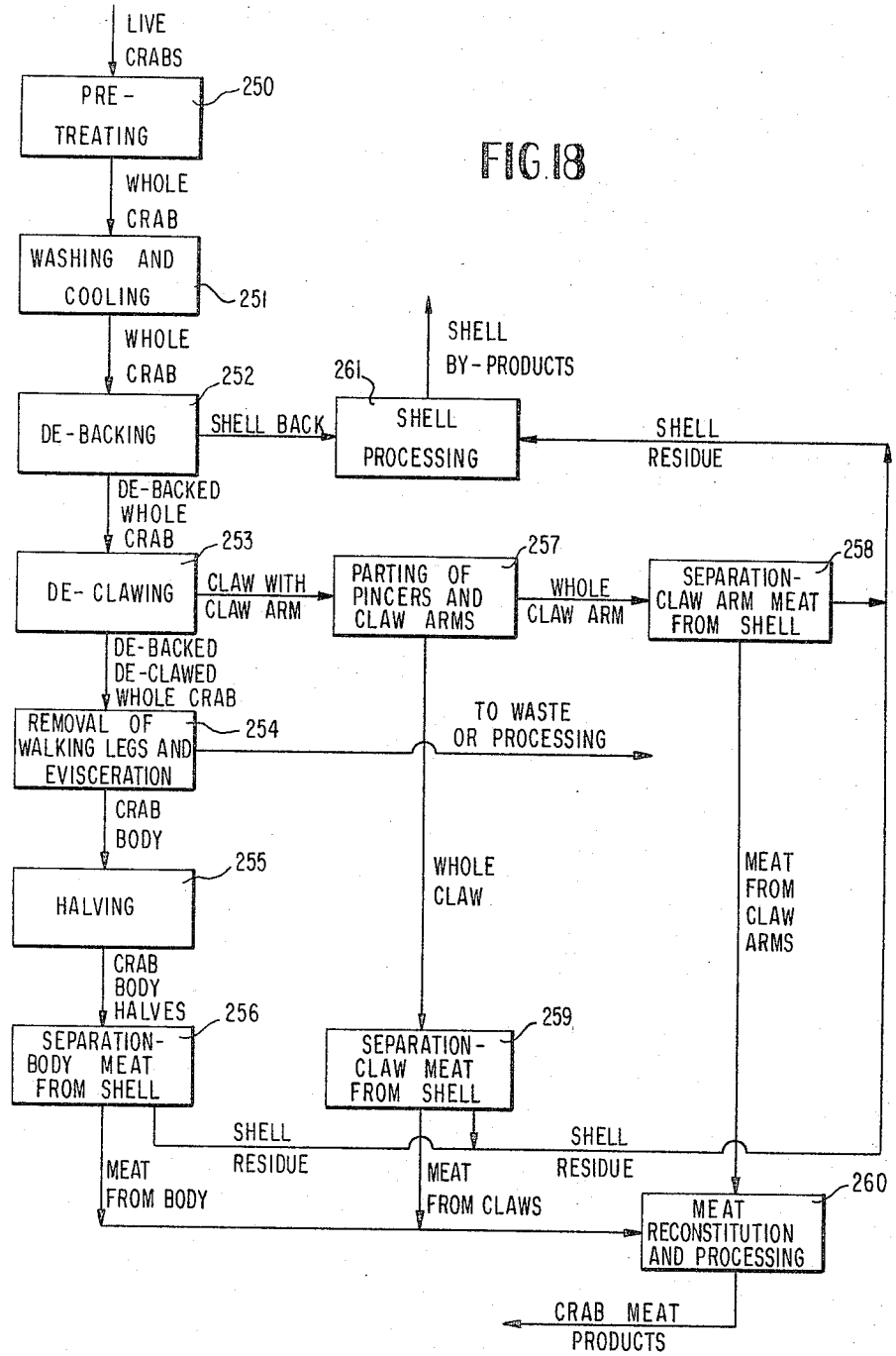
FIGURE 18 is a diagrammatic representation of the method of this invention.

FIGURE 18 illustrates diagrammatically the various steps constituting the novel method of this invention for the handling of crabs and the processing of the meat. The live crabs are pretreated at 250 to prepare the meat for the subsequent operations. The pretreating makes the meat firm and tends to loosen or separate the desirable meaty portions from the hard shell and yet does not make the shell portions brittle. The pretreated crabs are washed and cooled at 251. Debacking 252 is accomplished manually, wherein the backs of the shells are separated from the remaining body portions. Similarly, the claws are removed from the bodies 253 manually so that the body portions may be handled separately from the claws. Next, the body portions are eviscerated 254 with a possibility that some of the walking legs may be removed. The body portions are then cut in half 255 after which the meat in the body halves is separated from the hard shell 256. The pincers and the claw arms are separated 257 after which the claw arms are treated separately to remove the meat from the shell, and the pincers are treated separately to remove the meat from the shells 259. The meat from the body portion, the meat from the claw arms and the meat from the pincers are collected. The meat can be reconstituted as by pressing it together and then cooking, or it can be processed by other means; for example, cooking the meat in the presence of oils obtained from the backs of the crabs, or by adding seasoning, by freezing, or by other means 260. The shell can be collected, including the backs and the boney fragments from the body, as well as the shell from the claw arms and the pincer portions, and processed into usable by-products 261.

While the apparatus and method of this invention has been illutsrated and described in a particular embodiment, relations and changes may be made therein without departing from the invention as set forth in the claims.

We claim:

1. Apparatus for the continuous processing of crabs to obtain the meat therefrom including means for pretreating the crabs under conditions of controlled temperature and time to make the crab meat firm but not fully cooked, means for cooling and washing the pretreated crabs, first conveyor means for transferring the crabs from said pretreating means to said cooling and washing means, a crab handling station at which the crabs are debacked and declawed, and second conveyor means for transferring the crabs from said washing and cooling means to said crab handling station.

2. Apparatus according to claim 1, further including means at said station for providing separate positions for a plurality of workers to manually deback and declaw the crabs, and third conveyor means for carrying the debacked and declawed crab bodies away from said station, said second and third conveyor means being overlapped and spaced apart vertically at said positions.

3. Apparatus according to claim 2 further including a fourth conveyor means for carrying the crab backs away from the station, and fifth conveyor means for carrying the crab claws away from the station.

4. Apparatus according to claim 3 wherein said fourth and fifth conveyor means each include a conveyor spaced apart vertically with respect to the overlapped portions of the first and second conveyor.

5. In apparatus for the continuous processing of crabs to obtain the meat therefrom, eviscerating means including an endless type conveyor, a series of clamps on the conveyor, each clamp adapted to hold a debacked crab on the conveyor, first brush means located above the conveyor and rotating about an axis parallel with the direction of movement of the conveyor, and second brush means located above the conveyor and rotating about an axis perpendicular to the direction of movement of the conveyor, the first and second brush means including bristles adapted to sweep across and eviscerate each crab as the crabs are carried past said brush means by the conveyor.

6. Apparatus according to claim 5, further including washing means positioned adjacent the conveyor for washing away eviscerated parts of the crabs, and cutting means positioned adjacent the conveyor and extending in said path for cutting the crabs into two parts as the conveyor propels the crabs into said cutting means.

7. In apparatus for the continuous processing of crabs to obtain the meat therefrom, means for halving the bodies of crabs including a single endless belt conveyor, a series of clamps on the conveyor aligned in the direction of movement of the conveyor, each of said clamps being mounted on the outer surface of said belt and including arms spaced apart transversely of the direction of movement of the conveyor for holding a crab on the conveyor, and cutting means positioned immediately adjacent the conveyor in the path of the clamps for passage of the arms of each clamp on either side of the cutting means so that the crabs are carried through the cutting means and cut into parts.

8. In apparatus for the continuous processing of crabs to obtain the meat therefrom, means for separating meat from the shell and boney fragment, including two cone-shaped members each having a resilient surface, means for mounting the members in side-by-side contiguous engagement with said surface of each of said members being at substantially the same elevation, and means for rotating said members so that the adjacent portions thereof turn downwardly.

9. In apparatus for the continuous processing of crabs to obtain the meat therefrom, in combination, two elongated rollers aligned side-by-side and disposed at a substantial angle with respect to the horizontal, said elongated rollers rotating so that the adjacent portions turn upwardly, and two cone-shaped members each having a resilient surface and aligned side-by-side in linear contact with said surface of each of said members being at substantially the same elevation, said members rotating so that the adjacent portions turn downwardly, the line of contact of said members being below and aligned with the elongated rollers whereby crabs to be processed are fed downwardly along said rollers and onto said line of contact between said members.

10. In apparatus for the continuous processing of crabs to obtain the meat therefrom, in combination, two elongated rotatable rollers aligned side-by-side, and two rotatable heads having flexible curved surfaces contiguously disposed side-by-side at substantially the same elevation to provide a line of contact, said elongated rollers extending downwardly toward said line of contact between said heads, means for rotating said rollers so that the adjacent portions turn upwardly, and means for rotating said heads at approximately thirty revolutions per minute so that adjacent portions turn away from said rollers, whereupon crabs to be processed are moved downwardly along said rollers and onto said line of contact between said heads.

11. In apparatus for the continuous processing of crabs to obtain the meat therefrom, means for separating a series of crab claws into groups according to size including two spaced apart rollers, means for depositing the claws on top of one end of the rollers, said rollers rotating with the adjacent portions turning upwardly, said rollers having means on the surface thereof extending in spiral fashion for propelling the claws therealong, and the space between said rollers gradually increasing to allow claws of different size to fall between said rollers at corresponding different areas along the rollers.

12. Apparatus according to claim 11 further comprising in combination, separate means for cracking the shells of the claws of each group and separate means for receiving the claws of each group as the claws fall from the rollers and means for transferring the claws of each group to the shell cracking means.

13. In apparatus for the continuous processing of crabs to obtain the meat therefrom, means for cracking the shell of crab claws including means for continuously separating a series of claws into groups according to size, separate means for each group for cracking the shell of the claws, and means for transferring the claws of each group to said separate shell cracking means, said cracking means including a plurality of wheels each having a grooved circumferential surface, said wheels being positioned so that the grooved surfaces form a circular passage between the wheels, the maximum dimension of the circular passage being approximately one-sixteenth inch smaller than the maximum dimension of the claws of respective groups.

14. In apparatus for the continuous processing of crabs to obtain the meat therefrom, means for cracking the shells of the claws of the crabs including a plurality of wheels each having a grooved circumferential surface, said wheels being positioned so that the grooved surfaces form an enclosed passage between the wheels, and means for rotating said wheels to force the claws through the passage to crack the shells of the claws.

15. Apparatus according to claim 14 wherein the grooved surfaces are provided with bead means which protrude into the passage to enhance the cracking of the shells.

16. Apparatus according to claim 14 further including gears on the wheels meshed with the gears on the adjacent wheel whereupon rotation of one wheel rotates the remaining wheels.

17. Apparatus for the continuous processing of crabs to obtain the meat therefrom, comprising in combination means for pretreating the meat of the crabs under a condition of controlled temperature and time to make the meat firm but not fully cooked, means providing a station for the manual debacking and declawing of the crabs, brushing means for eviscerating the debacked crabs, means for halving the eviscerated crabs, and means for separating the meat from the shell of the halved crabs.

18. Apparatus for the continuous processing of crabs to obtain the meat therefrom, comprising in combination means for pretreating the meat of the crabs under a condition of controlled temperature and time to make the meat firm but not fully cooked, means for washing and cooling the pretreated crabs, conveyor means for transferring the crabs from the pretreating means to the washing and cooling means, means providing a station for the manual debacking and declawing of the crabs, conveying means for transferring the crabs from the washing and cooling means to the debacking and declawing station, brushing means for eviscerating the debacked crabs, conveying means for transferring the crabs from the debacking and declawing station to the brushing means, means for halving the eviscerated crabs, conveying means for transferring the crabs from the eviscerating means to the halving means, means for separating the meat from the shell of the halved crabs, conveying means for moving the crab halves from the halving means to the meat separating means, means for cracking the shells of the claws, conveying means for transferring the claws from the debacking and declawing station to the cracking means, means providing a station for the manual separation of the meat from the shell of the claws, and conveying means for transferring the cracked claws from the cracking means to the claw meat separating station.

References Cited

UNITED STATES PATENTS

| | | | |
|---|---|---|---|
| 1,750,329 | 3/1930 | Patchen et al. | 17—2 |
| 2,502,091 | 3/1950 | Harris et al. | 17—4 |
| 2,574,044 | 11/1951 | Lapeyre et al. | 17—2 |
| 2,660,754 | 12/1953 | Roshko | 17—2 |
| 2,784,447 | 3/1957 | Thompson et al. | 17—2 |
| 2,838,786 | 6/1958 | Ward | 17—2 |
| 2,853,733 | 9/1958 | Greiner | 17—2 |
| 3,156,946 | 11/1964 | Moncure | 17—2 |
| 3,230,578 | 1/1966 | Marvin et al. | 17—45 |
| 3,251,091 | 5/1966 | Altman | 17—2 |
| 3,253,299 | 5/1966 | Harris | 17—2 X |

FOREIGN PATENTS

| | | |
|---|---|---|
| 157,400 | 7/1954 | Australia. |

LUCIE H. LAUDENSLAGER, *Primary Examiner.*